United States Patent
Patwardhan et al.

(10) Patent No.: US 11,892,951 B2
(45) Date of Patent: Feb. 6, 2024

(54) KEY PACKING FOR FLASH KEY VALUE STORE OPERATIONS

(71) Applicant: Samsung Electronics Co., Ltd., Gyeonggi-do (KR)

(72) Inventors: Kedar Shrikrishna Patwardhan, Newport Beach, CA (US); Nithya Ramakrishnan, San Diego, CA (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 18/196,185

(22) Filed: May 11, 2023

(65) Prior Publication Data
US 2023/0281130 A1 Sep. 7, 2023

Related U.S. Application Data

(63) Continuation of application No. 17/481,897, filed on Sep. 22, 2021, now abandoned.
(Continued)

(51) Int. Cl.
*G06F 12/00* (2006.01)
*G06F 12/0864* (2016.01)
(Continued)

(52) U.S. Cl.
CPC ........ *G06F 12/0864* (2013.01); *G06F 3/0604* (2013.01); *G06F 3/0644* (2013.01); *G06F 3/0673* (2013.01); *G06F 12/0882* (2013.01)

(58) Field of Classification Search
CPC .. G06F 12/0864; G06F 3/0604; G06F 3/0644; G06F 3/0673; G06F 12/0882;
(Continued)

(56) References Cited

U.S. PATENT DOCUMENTS

| 5,490,258 A | 2/1996 | Fenner |
| 9,280,609 B2 | 3/2016 | Liu |

(Continued)

FOREIGN PATENT DOCUMENTS

| CN | 106201349 | 6/2019 |
| WO | WO 2019/156309 | 8/2019 |
| WO | WO 2020/186081 | 9/2020 |

OTHER PUBLICATIONS

Gilad, Eran et al., "EvenDB: Optimizing Key-Value Storage for Spatial Locality", Proceedings of the 15th European Conference on Computer Systems (EuroSys '20, Apr. 2020), Association for Computing Machinery, New York, NY, USA, Article 27, 1-16.
(Continued)

*Primary Examiner* — John A Lane
(74) *Attorney, Agent, or Firm* — The Farrell Law Firm, P.C.

(57) ABSTRACT

A key value (KV) store, a method thereof, and a storage system are provided herein. The KV store may include a key logger; and a processor configured to receive a first command for storing a first KV in the KV store, write a first value of the first KV to a first NAND page, generate an extent map for identifying the first memory page including the first value, write the extent map to a second memory page, append an entry for storing the first KV to the key logger, and update a device hashmap of the KV store to include a first key of the first KV, upon a threshold being met within the key logger.

20 Claims, 11 Drawing Sheets

Related U.S. Application Data

(60) Provisional application No. 63/222,685, filed on Jul. 16, 2021.

(51) Int. Cl.
   *G06F 3/06*       (2006.01)
   *G06F 12/0882*    (2016.01)

(58) Field of Classification Search
   CPC ............... G06F 16/325; G06F 19/9014; G06F 16/2244; G06F 16/2272
   See application file for complete search history.

(56) References Cited

U.S. PATENT DOCUMENTS

| | | | |
|---|---|---|---|
| 9,355,109 | B2 | 5/2016 | Archak et al. |
| 9,529,724 | B2 | 12/2016 | Jannyavula Venkata et al. |
| 9,619,160 | B2 | 4/2017 | Patel et al. |
| 10,210,067 | B1 | 2/2019 | Wils |
| 10,289,345 | B1 | 5/2019 | Wils |
| 10,558,705 | B2 | 2/2020 | Sengupta et al. |
| 10,579,305 | B2 | 3/2020 | Lu |
| 10,706,105 | B2 | 7/2020 | Boles et al. |
| 10,706,106 | B2 | 7/2020 | Boles et al. |
| 10,725,988 | B2 | 7/2020 | Boles et al. |
| 10,769,064 | B1 | 9/2020 | Twitto |
| 10,783,186 | B2 | 9/2020 | Boles et al. |
| 11,403,273 | B1* | 8/2022 | Burgmeier ........... G06F 16/2237 |
| 11,474,699 | B1* | 10/2022 | Saha ..................... H04L 9/0643 |
| 11,755,555 | B2* | 9/2023 | Paduroiu ............. G06F 16/2282 707/696 |
| 2016/0099810 | A1* | 4/2016 | Li ......................... H04L 9/3242 713/193 |
| 2019/0042571 | A1* | 2/2019 | Li ............................ G06F 3/061 |
| 2019/0057140 | A1 | 2/2019 | Pitchumani |
| 2020/0026446 | A1 | 1/2020 | Jawahar et al. |
| 2020/0159629 | A1 | 5/2020 | Zhang et al. |
| 2020/0334292 | A1 | 10/2020 | Ganeshan et al. |
| 2021/0157746 | A1 | 5/2021 | Lee et al. |
| 2021/0334257 | A1* | 10/2021 | Bensberg ........... G06F 16/2255 |
| 2022/0011948 | A1* | 1/2022 | Kang ................... G06F 3/0638 |
| 2022/0092046 | A1* | 3/2022 | Tomlin ................ G06F 3/0679 |
| 2022/0382760 | A1* | 12/2022 | Pang .................... G06F 16/2246 |

OTHER PUBLICATIONS

Zhang, Qi et al., "Optimizing Translation Information Management in NAND Flash Memory Storage Systems", 013 18th Asia and South Pacific Design Automation Conference, (ASP-DAC), 2013, pp. 326-331.

European Search Report dated Dec. 14, 2022 issued in counterpart application No. 22182798.3-1224, 8 pages.

* cited by examiner

KEY PACKING FOR FLASH KEY VALUE STORE OPERATIONS

PRIORITY

This application is a Continuation of U.S. application Ser. No. 17/481,897, which was filed in the U.S. Patent and Trademark Office (USPTO) on Sep. 22, 2021, and is based on and claims priority under 35 U.S.C. § 119(e) to U.S. Provisional Patent Application Ser. No. 63/222,685, which was filed in the USPTO on Jul. 16, 2021, the entire content of each of which is incorporated herein by reference.

TECHNICAL AREA

The present disclosure relates generally to key value (KV) store operations, and more particularly to improving KV store operations by storing multiple keys together in a single NAND page.

BACKGROUND

A KV store or a KV database, is a data storage paradigm designed for storing, retrieving, and managing associative arrays, and a data structure more commonly known as a hash table. Hash tables contain a collection of objects, or records, which in turn have many different fields within them, each containing data. These records may be stored and retrieved using a key that uniquely identifies the record, and may be used to find the data within the database. KV stores often use less memory than a relational database.

The above information is presented as background information only to assist with an understanding of the disclosure. No determination has been made, and no assertion is made, as to whether any of the above might be applicable as prior art with regard to the disclosure.

SUMMARY

The present disclosure is made to address at least some of the disadvantages described above and to provide at least the advantages described below.

An aspect of the present disclosure is to provide a system and method that allows packing of multiple keys inserted with no temporal locality, such that they may be grouped into a bunch of memory pages (e.g. NAND pages) with spatial locality. This provides a reduction in the number of NAND pages required to store all keys, and read amplification factor (RAF)/write amplification factor (WAF) reduction due to dense key packing. Further, NAND pages may limit garbage collection (GC) to when all keys in a page are invalidated.

Accordingly, the present disclosure may significantly reduce GC overheads by a factor of packing density and reduce lengths of hash-map collision chains, which improves tail latency and lessens the number of NAND page reads that significantly decrease lookup latencies.

According to one embodiment, a KV store may be provided, which includes a key logger; and a processor configured to receive a first command for storing a first KV in the KV store, write a first value of the first KV to a first memory page, generate an extent map for identifying the first memory page including the value, write the extent map to a second memory page, append an entry for storing the first KV to the key logger, and update a device hashmap of the KV store to include a first key of the first KV, upon a threshold being met within the key logger.

According to one embodiment, a method of operating a KV store may be provided. The method includes receiving a first command for storing a first KV in the KV store; writing a first value of the first KV to a first memory page; generating an extent map for identifying the first memory page including the value; writing the extent map to a second NAND page; appending an entry for storing the first KV to a key logger of the KV store; and updating a device hashmap of the KV store to include a first key of the first KV, upon a threshold being met within the key logger.

According to one embodiment, a storage system may be provided, which includes a KV store; and a processor configured to receive a first command for storing a first KV in the KV store, write a first value of the first KV to a first memory page, generate an extent map for identifying the first memory page including the value, write the extent map to a second memory page, append an entry for storing the first KV to a key logger of the KV store, and update a device hashmap of the KV store to include a first key of the first KV, upon a threshold being met within the key logger.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
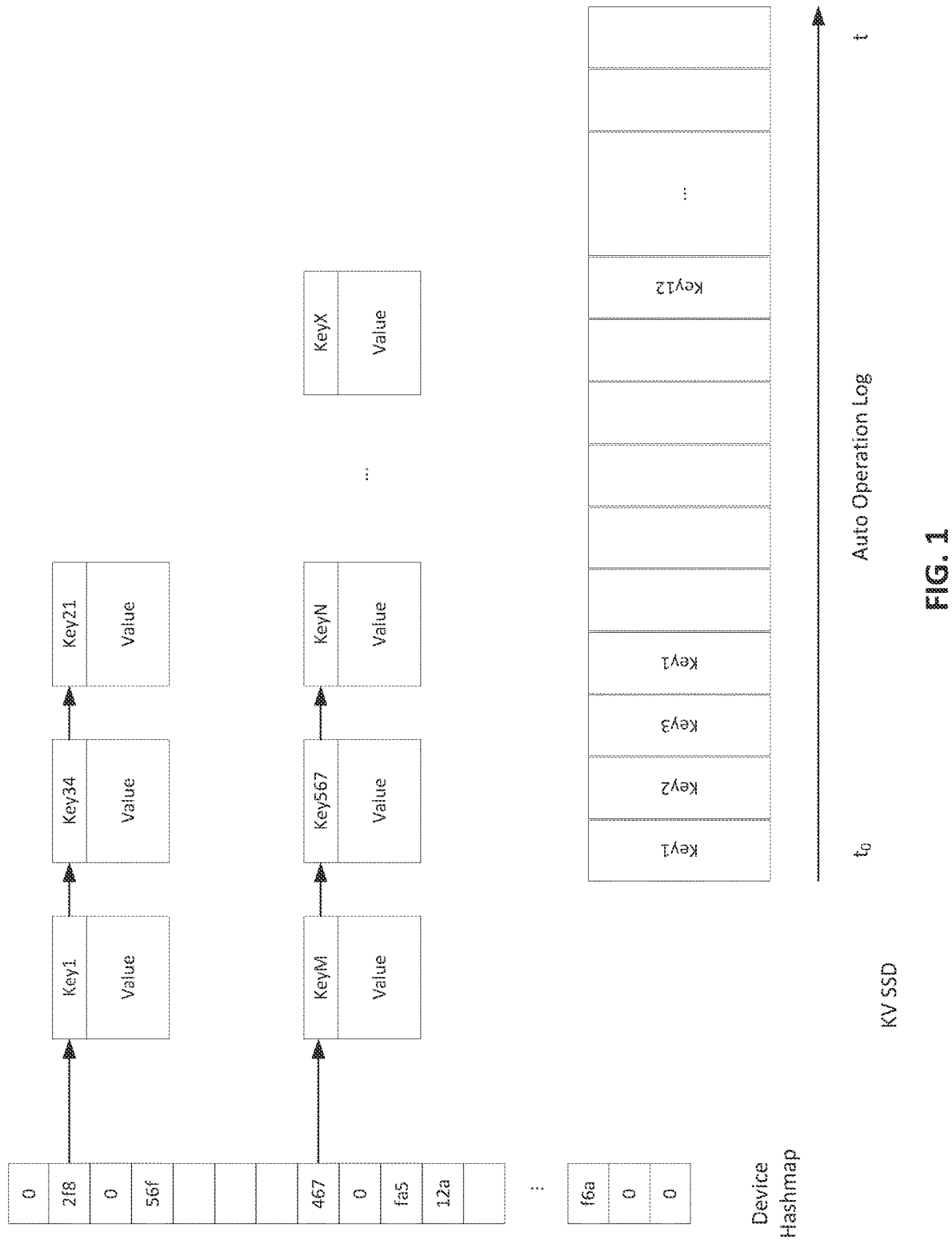
FIG. 1 illustrates a hash implementation in a KV solid state device (SSD)

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2 nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Herein, any of the components or any combination of the components described (i.e., in the device diagrams) can be used to perform one or more of the operations of the flowcharts. The operations depicted in the flowcharts are exemplary operations and may involve various additional steps not explicitly provided in the flowcharts. The order of the operations depicted in the flowcharts is exemplary and not exclusive, as the order may vary depending on the implementation.

An objective of a KV store may be to complete operations (e.g., Put/Get/Delete operations) in the fastest time possible, and in a typical KV store implementation, keys can be hashed and inserted into a hashmap.

Reducing tail latency of KV operations may be beneficial for several workloads like artificial intelligence/machine learning (AI/ML), data sciences, etc. Further, it may be beneficial that KV technology will adapt to dense media with lower longevity.

High performance computing (HPC) storage may be designed to be compatible with media having 50-500 write cycles. Consequently, reducing a WAF caused by application or device induced GC may also be beneficial. For example, reducing device WAF may also decrease an RAF in KV stores, possibly improving overall storage performance.

A single NAND page can contain one key, which may result in higher device WAF when processing Delete operations and higher RAF when processing Put/Get/Exist operations.

Additionally, worst case tail latency of a KV store may be proportional to a length of a longest collision chain in buckets of the hashmap. Increasing a number of buckets to reduce collision chains results in extra memory space required to host the buckets.

Further, if buckets are themselves stored in NAND, when processing Put of a KV, device WAF increases, since for almost each KV insert, the NAND page hosting the bucket may need to be replaced.

In accordance with this disclosure, systems and methods are provided, which allow for the packing of multiple keys together in a single NAND page, which may reduce worst case collision length in a device hashmap. Keys in the device hashmap may be grouped together to have spatial locality even though the keys themselves have no temporal locality.

FIG. 1 illustrates a hash implementation in a KV SSD.

As illustrated in FIG. 1, keys are hashed and inserted into a hashmap. However, a single NAND page can contain only one key. For example, bucket 2/8 in the hashmap incudes a chain for Key1, Key34, and Key21. Each of Key1, Key34, and Key21 is stored on a separate NAND page. As described above, this may result in higher RAF during Puts/Gets/Exists, and higher device WAF during Deletes. Further, the worst case tail latency may be proportional to the length of longest collision chain in buckets of the hashmap, e.g., bucket 467 in FIG. 1.

In accordance with an embodiment of the disclosure, multiple keys may be packed together in a single NAND page to reduce the worst case collision length in a hashmap by a packing factor P (average number of keys packed per page).

Figure 2:
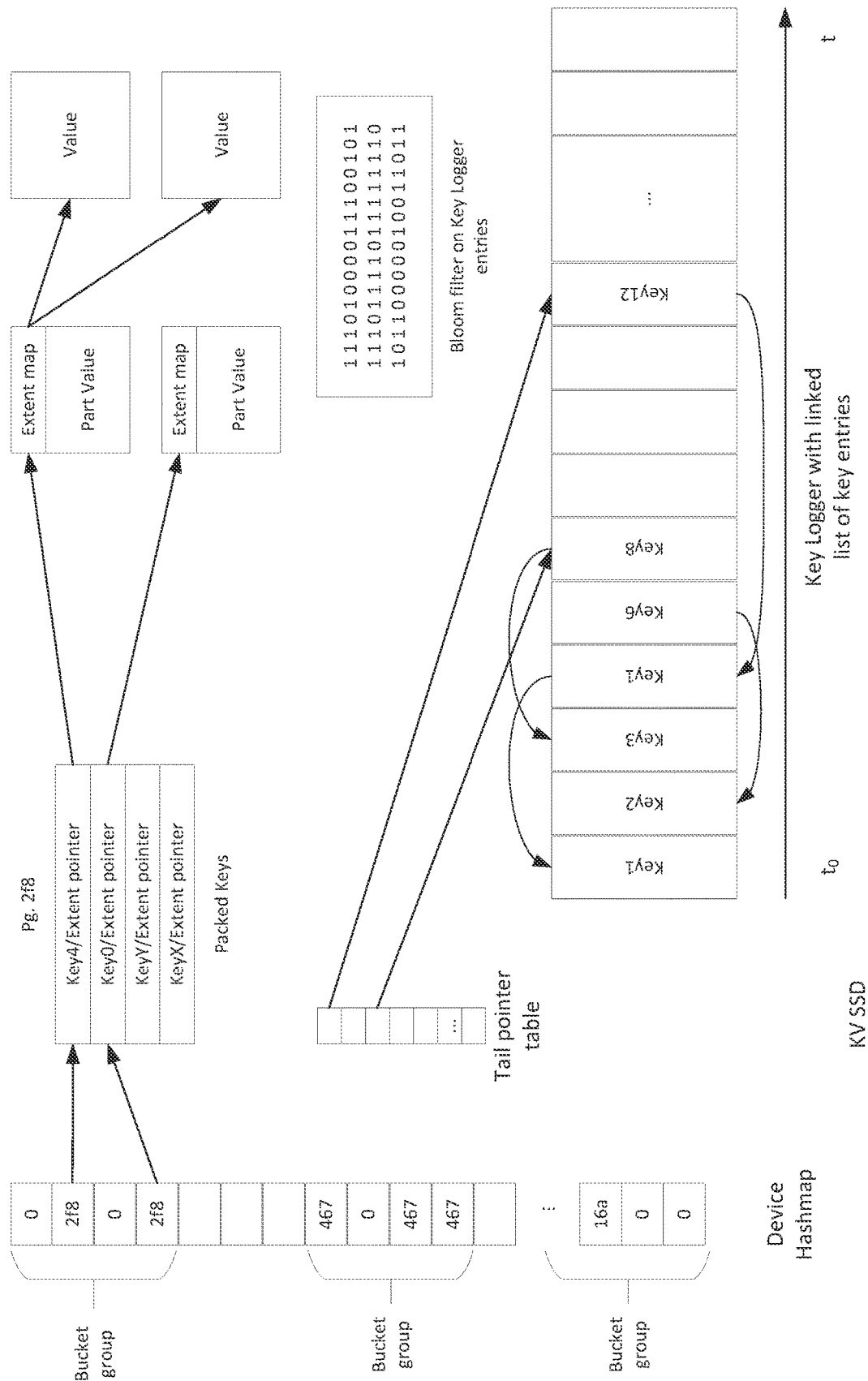
FIG. 2 illustrates a hash implementation in a KV SSD, according to an embodiment.

FIG. 2 illustrates a hash implementation in a KV SSD, according to an embodiment Referring to FIG. 2, multiple keys may be packed together in a single NAND page, wherein each key contains an extent pointer.

A method according to an embodiment of the disclosure includes gathering related keys that have no temporal locality and grouping them together to have spatial locality. That is, keys that are indexed within contiguous buckets of the hashmap may be grouped into bucket groups.

Additionally, the format of the KV entries may be modified such that a value may be written to NAND pages and may be tracked by an extent map. The extent map itself may be written to a NAND page, which may also contain part of the value, if space is available in the NAND page after writing the extent map. A key contains one extent pointer to the NAND page that contains the actual extent map, which in turn locates the pages containing the value for the key.

This may significantly reduce device WAF/RAF when processing Get/Put/Delete operations by an entire factor of P. For example, if on an average, 4 keys can be packed into a page, the collision chain length reduces by 4 times along with a corresponding device WAF/RAF reduction by 4 times.

Key packing, as described above, can be achieved with minimal additional resources consumed within the KV Store.

Figure 3:
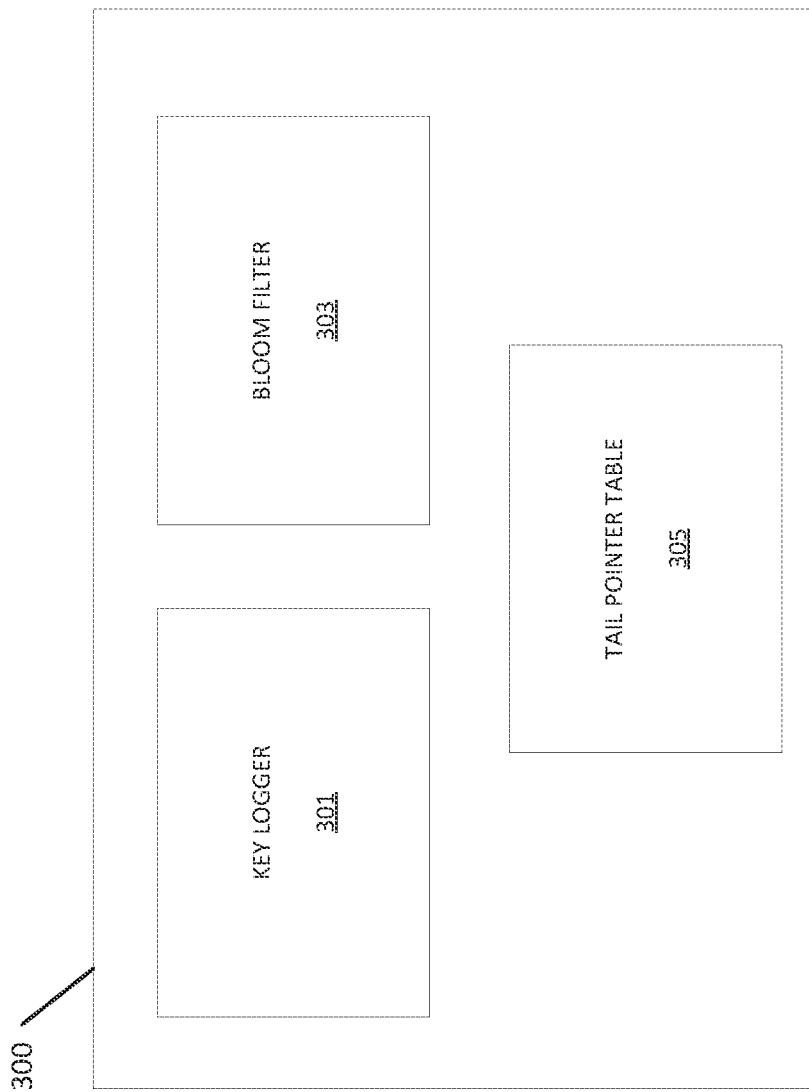
FIG. 3 illustrates a KV store, according to an embodiment.

FIG. 3 illustrates a KV store, according to an embodiment.

Referring to FIG. 3, the KV store 300 includes a key logger 301 (e.g., an Auto Operation Logger (AOL)) that may be used to assist in key packing, a Bloom filter 303 to track keys in key logger 301, and a tail pointer table 305 to create a back linked-list of keys in the key logger 301.

key logger 301 may be device wide and may only have append operations to it. Therefore, it may be implemented internally, like a Zoned namespace.

A Bloom filter 303 tracks keys in the key logger 301 and therefore may be compact.

For example, if the key logger 301 contains 10K entries, the Bloom filter 303 may include as few as 3 pages (each 4K RAM/SRAM/DRAM).

Given that less than 0.01% of keys are logged in the key logger 301, compared to total keys in KV stores, most of the Get/Put/Delete operations will not include traversing the tail pointer table 305 of entries in the key logger 301.

A tail pointer table 305 may be so constructed that if the Bloom filter 303 denotes a hit, the number of entries required to be traversed in the key logger 301 may be limited to one or two entries only. For example, if key logger 301 has 10K entries, the tail pointer table 305 may have 5K entries (each pointer being 16 bits only).

Although FIG. 3 illustrates the components of the KV store 300 as separate elements, the disclosure is not limited thereto. For example, at least two of the components may be combined into a single element, such as a processor, integrated circuit (IC), system on chip (SoC), etc., which pay perform the corresponding operations.

Figure 4A:
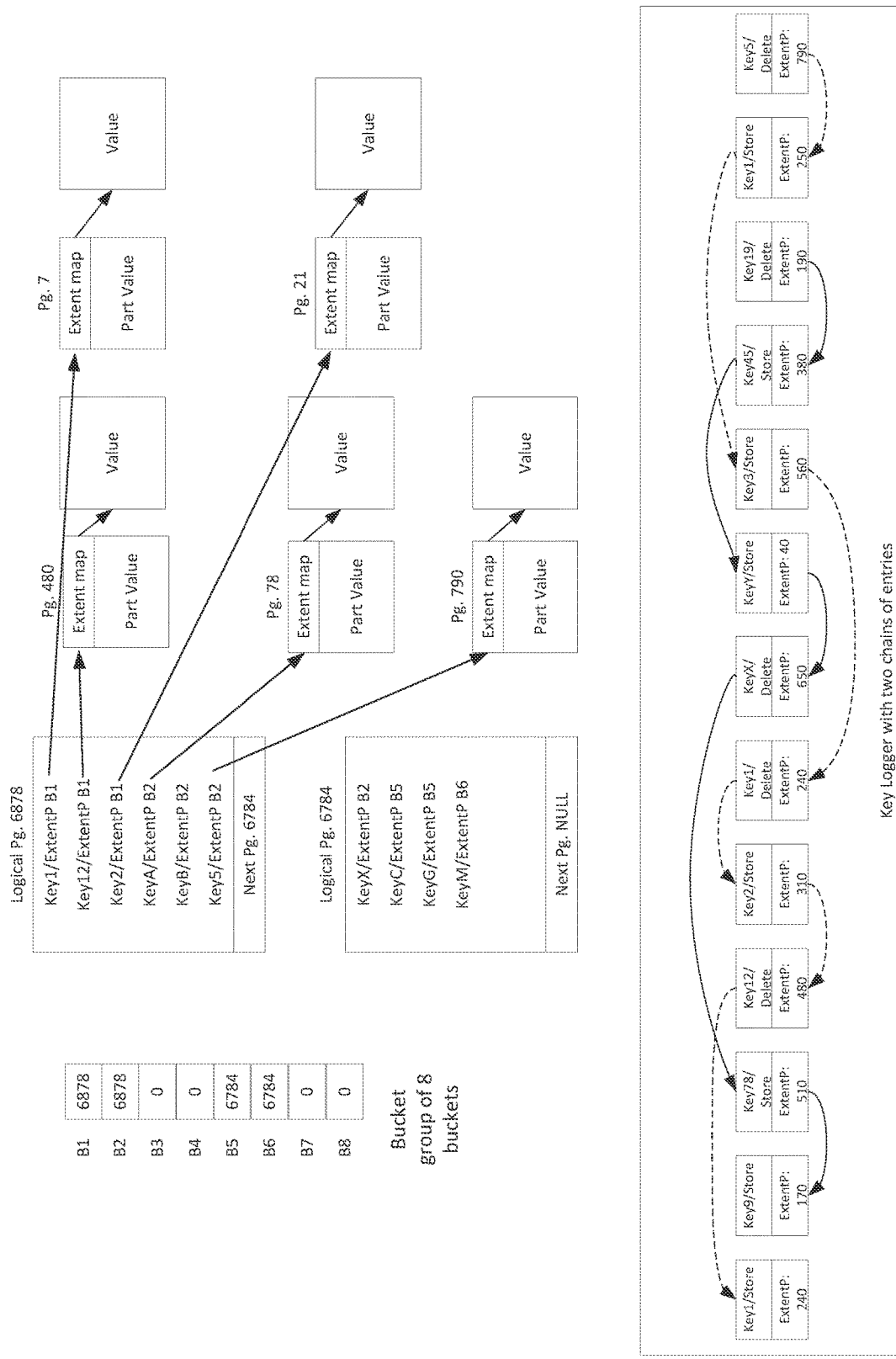
FIGS. 4A and 4B illustrate a deferred key packing operation in a KV store, according to an embodiment.
Figure 4B:
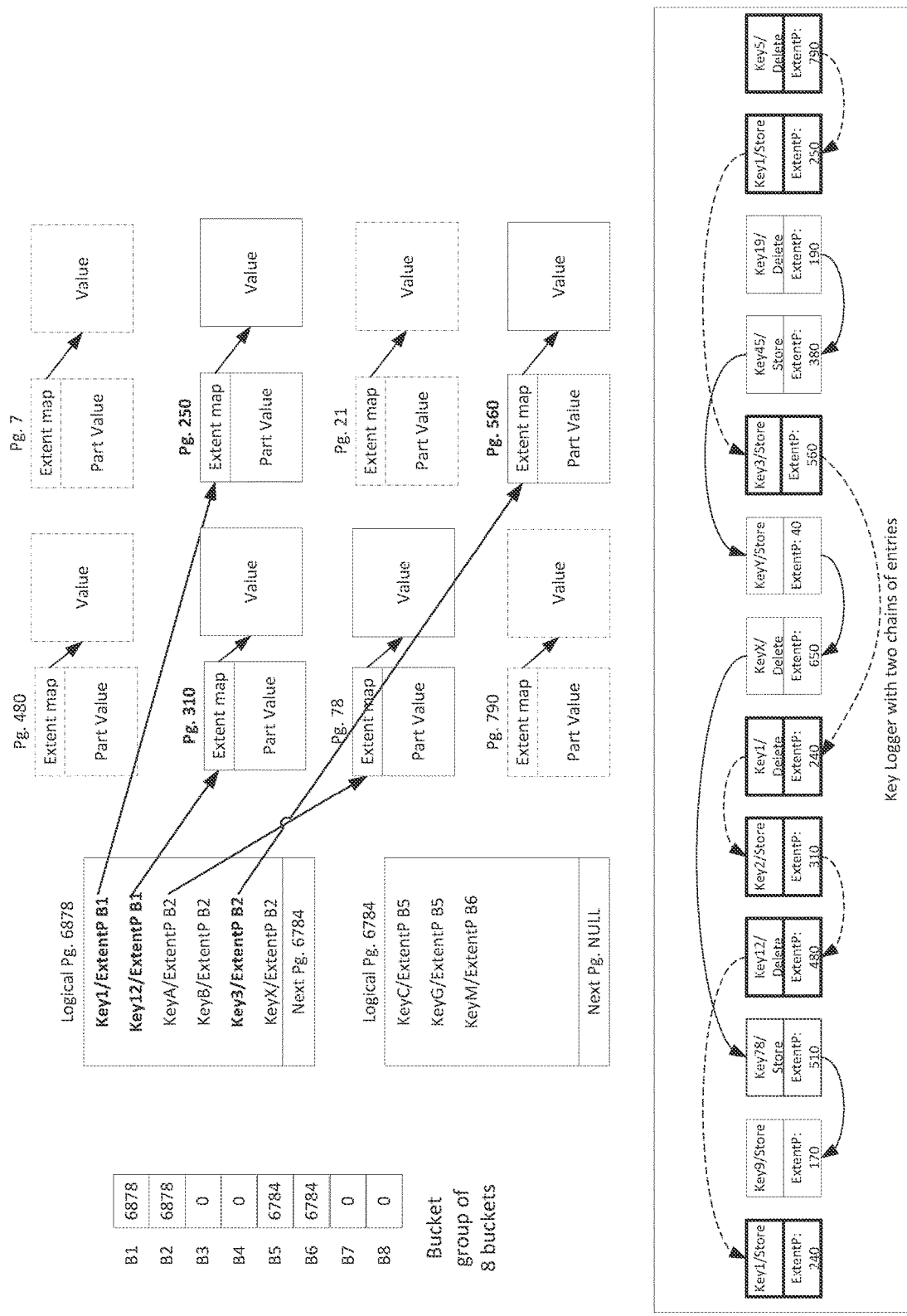

FIGS. 4A and 4B illustrate a deferred key packing operation in a KV store, according to an embodiment. More specifically, FIG. 4A illustrates an example before processing deferred key packing in KV stores, and FIG. 4B illustrates an example after processing deferred packing of keys from a key logger. The deferred key packing operation may be based on Store (or Put) and Delete operations on KVs being first written only to the key logger. That is, instead of immediately performing the received Store and Delete operations, the entries may be written in the key logger until a certain threshold is reached and the operation may be performed. For example, the threshold may be a function of the percentage of entries in the key logger and/or a rate at which the key logger is filling up.

Referring to FIG. 4A, a bucket group includes 8 buckets B1 to B8 and points to logical NAND pages 6878 and 6784 on which multiple keys are packed with extent pointers (ExtentP). In the example illustrated in FIG. 4A, each logical NAND page may include a maximum of 6 keys, and includes a pointer to the next page containing keys of bucket group.

On logical page 6878, Key1 contains an extent pointer to an extent map stored on page 7. The extent map stored on page 7 identifies the page on which the value corresponding Key1 is stored. Similarly, Key12 contains an extent pointer to an extent map stored on page 480, Key2 contains an extent pointer to an extent map stored on page 21, KeyA contains an extent pointer to an extent map stored on page 78, and Key5 contains an extent pointer to an extent map stored on page 790. Each of the extent maps identifies the pages on which the values of the corresponding key are stored.

Additionally, FIG. 4A provides an example of a key logger with two chains of entries. Assuming that certain threshold is reached, the entries in the key logger may then be processed, i.e., deferred key packing may be performed.

Referring to FIG. 4B, among the entries of the chain being processed, there is a Store entry and a Delete entry for Key1/ExtentP 480, which essentially cancel each other out.

There is also Store entry for Key1/ExtentP 250. Accordingly, logical page 6878 receives a new entry for Key1 that contains an extent pointer to page 250, on which an extent map is stored, which identifies the pages one which the value corresponding to Key1 are stored.

Additionally, the old Key1 (as illustrated in FIG. 4A) is removed from logical page 6878, and page 7, which included the extent map for old Key 1, and the pages identified by the extent map for old Key1 are queued for erase.

Similarly, there is a Store entry for Key2/ExtentP 310. Accordingly, logical page 6878 receives a new entry for Key2 that contains an extent pointer to page 310, on which an extent map is stored, which identifies the pages one which the value corresponding to Key2 are stored.

Additionally, the old Key2 (as illustrated in FIG. 4A) is removed from logical page 6878, and page 21, which included the extent map for old Key2, and the pages identified by the extent map for old Key2 are queued for erase.

There is also a Store entry for Key3/ExtentP 560. Accordingly, logical page 6878 receives a new entry for Key3 that contains an extent pointer to page 560, on which an extent map is stored, which identifies the pages one which the value corresponding to Key3 are stored.

There is also a Delete entry for Key12, which results in Key12 being removed from logical page 6878, and page 480, which included the extent map for Key12, and the pages identified by the extent map for Key12 are queued for erase.

Similarly, there is a Delete entry for Key5, which results in Key5 being removed from logical page 6878, and page 790, which included the extent map for Key5, and the pages identified by the extent map for Key5 are queued for erase.

Because two keys were removed from logical page 6878 (Key12 and Key5) and one new key was added to logical page 6878 (Key3), only 5 keys are left on logical page 6878. Therefore, KeyX is moved from logical page 6784 (as illustrated in FIG. 3) to logical page 6878 (as illustrated in FIG. 4B) so that logical page 6878 includes the maximum of 6 keys.

Figure 5:
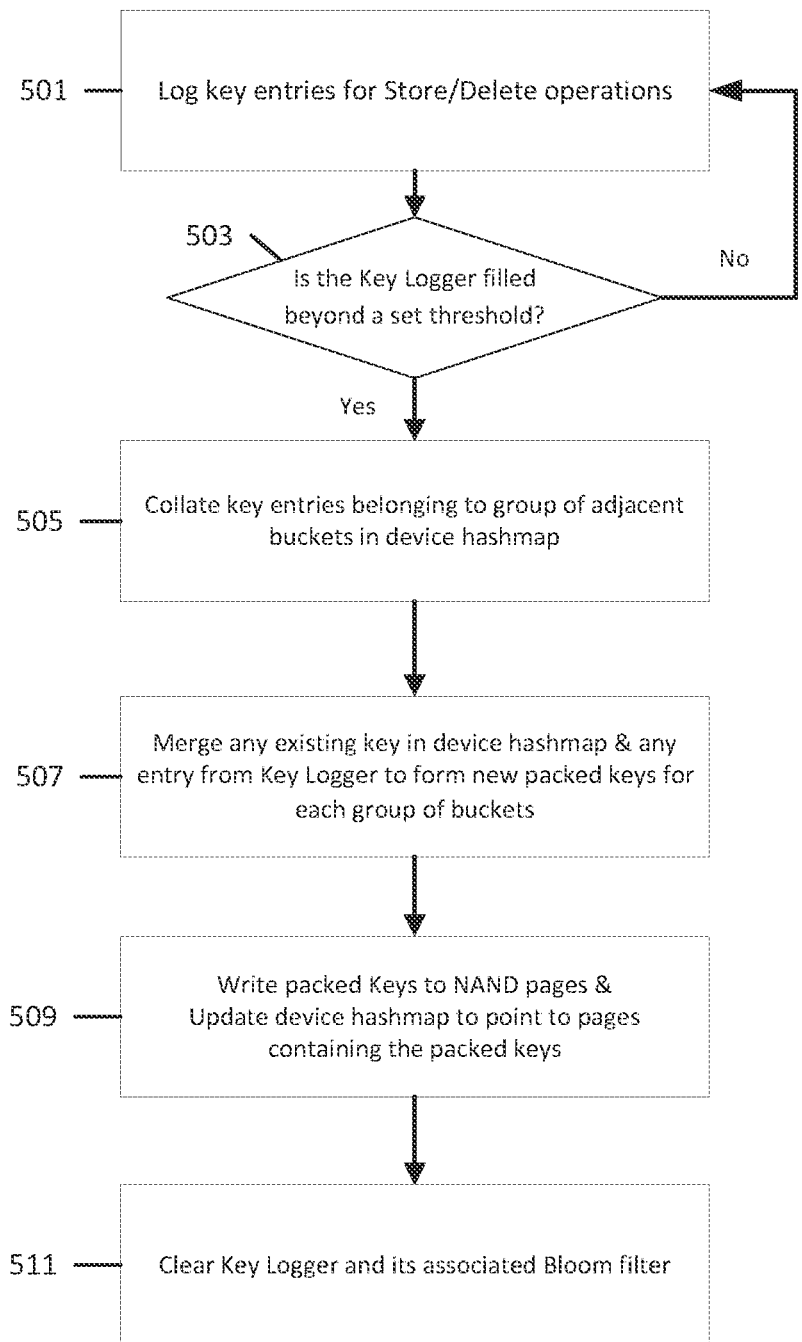
FIG. 5 is a flowchart illustrating a key packing operation of a KV store, according to an embodiment.

FIG. 5 is a flowchart illustrating a key packing operation of a KV store, according to an embodiment.

Referring to FIG. 5, in step 501, a key logger logs key entries for Store and Delete operations.

After a certain threshold is met in the key logger in step 503, e.g., the key logger is filled beyond a set threshold, key entries belonging to a group of adjacent buckets in a device hashmap are collated in step 505.

In step 507, existing keys in the device hashmap are merged with entries from the key logger to form new packed keys for each group of buckets.

In step 509, the packed keys are written to at least one NAND page and the device hashmap is updated to point to pages containing the packed keys.

In step 511, the key logger and its associated Bloom filter are cleared, such that the key logger can log new key entries.

Grouping keys that correspond to a group of buckets may be an operation of O(1) complexity.

Additionally, when adjacent buckets of a bucket group contain just one or two keys, they can end up sharing a packed key NAND page.

For continuity of Put/Delete/Get operations when a key logger is being processed, a device according to an embodiment can implement two or more independent key loggers.

Figure 6:
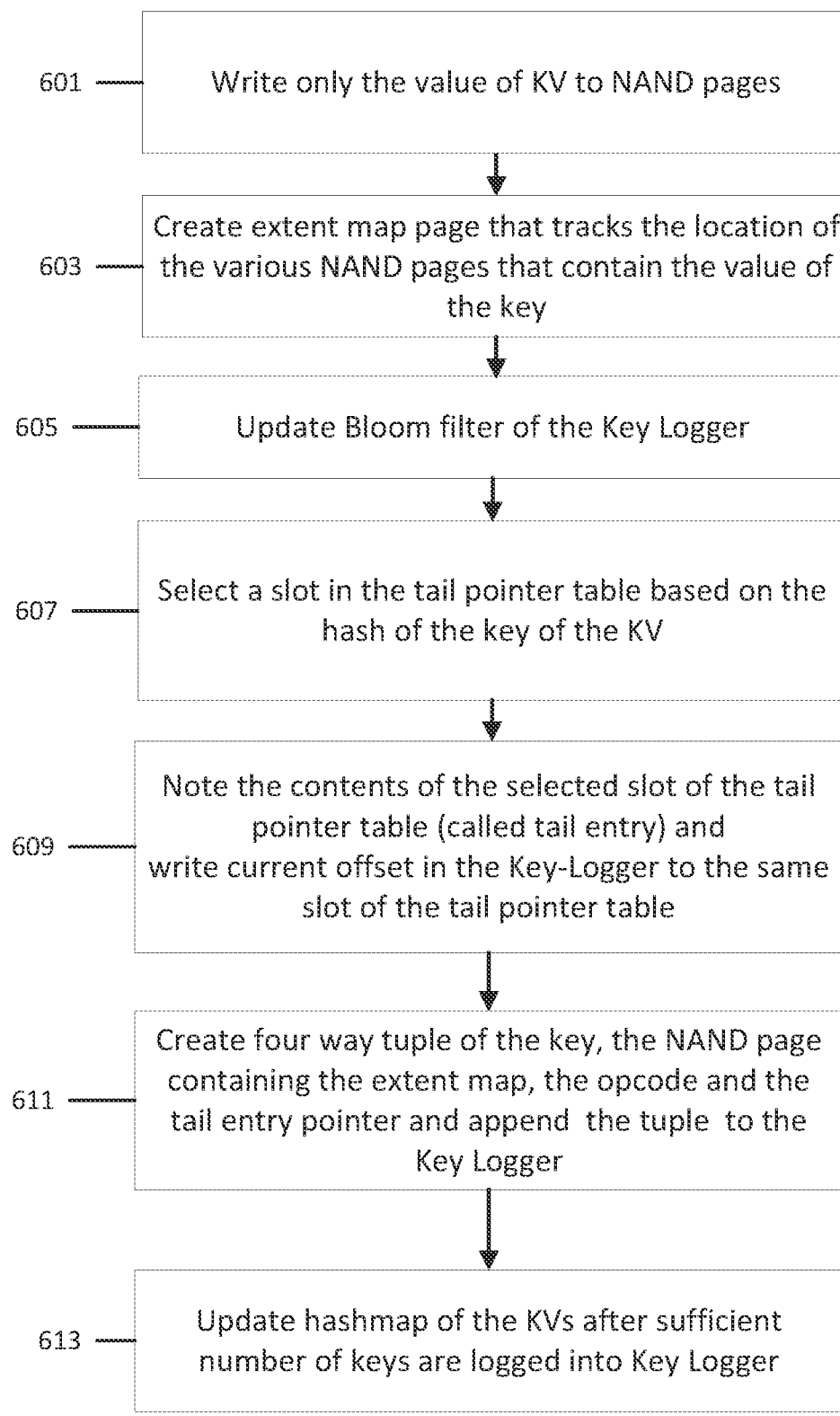
FIG. 6 is flowchart illustrating a Put operation of a KV store, according to an embodiment.

FIG. 6 is flowchart illustrating a Put operation of a KV store, according to an embodiment.

Referring to FIG. 6, in step 601, upon receiving Put command for storing a KV, the KV store writes only the value of the KV to NAND pages.

In step 603, the KV store creates an extent map page that tracks the location of the various NAND pages that contain the value of the KV.

In step 605, the Bloom filter of the key logger is updated. For example, the Bloom filter may be updated such that a pre-determined number of known hash functions may be used to set bits in the Bloom filter bitmap.

In step 607, a slot is selected in the tail pointer table based on the hash of the key of the KV. For example, the tail pointer table can contain K/2 entries, where K=total number of entries in the key logger.

In step 609, the KV store notes the contents of the selected slot of the tail pointer table (i.e., the tail entry) and writes a current offset in the key logger to the same slot of the tail pointer table. Basically, the tail pointer table may be a hashmap of entries that are present in the key logger such that each bucket pointer of the hashmap points to the latest entry that mapped to the bucket. The tail pointer table may reduce the number of slots to be traversed in the key logger to find a particular key that may be indicated to be likely present in the key logger by an associated Bloom filter.

In step 611, the KV store creates a four way tuple of the key, the NAND page containing the extent map, the opcode, and the tail entry pointer and appends the tuple to the key logger. Although FIG. 6 utilizes a four way tuple of the key, the disclosure is not limited thereto, and different sized tuples of the keys may be used.

In step 613, the KV store updates a hashmap of the KVs, after sufficient number of keys are logged into key logger.

Figure 7:
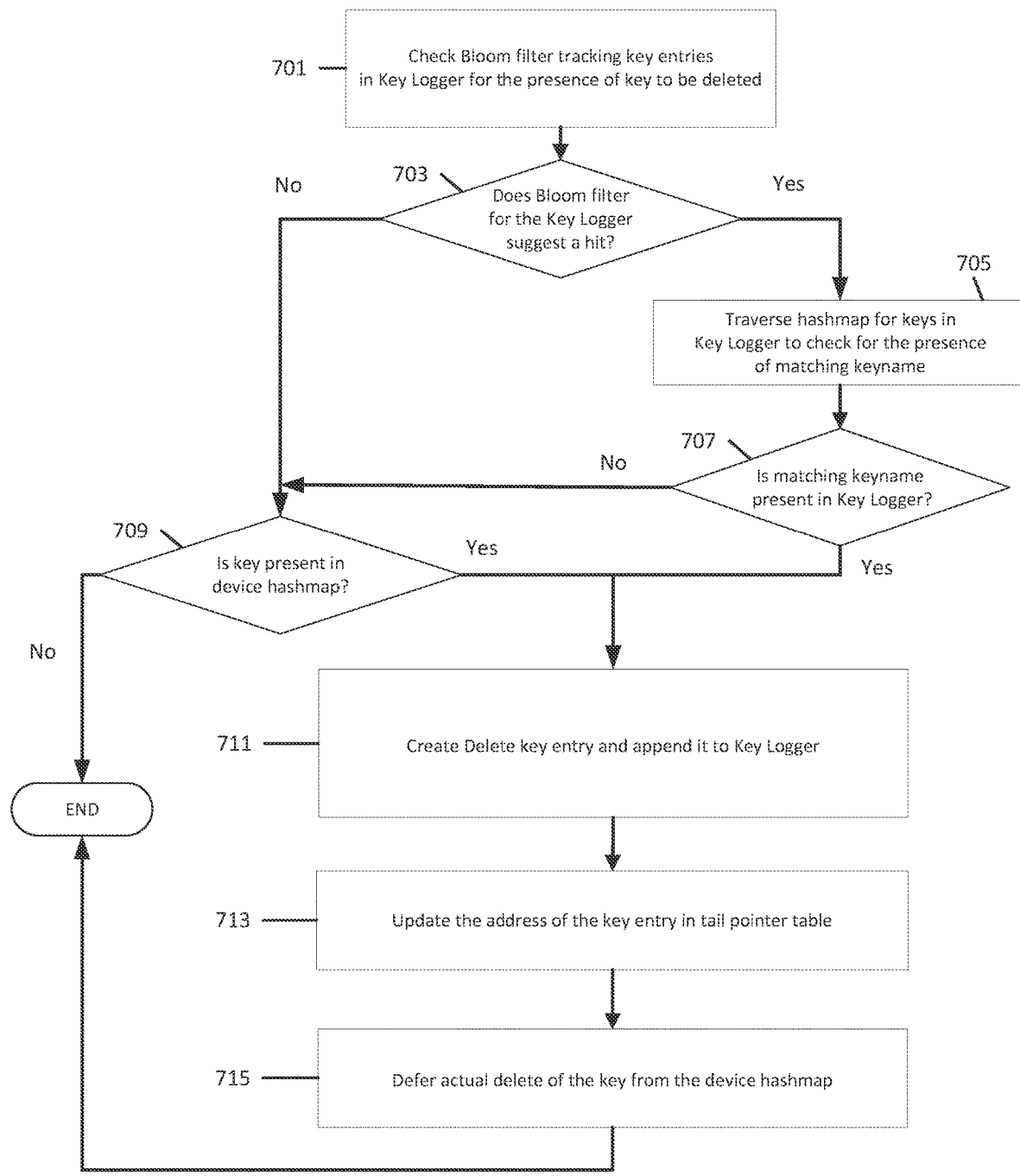
FIG. 7 is a flowchart illustrating a Delete operation of a KV store, according to an embodiment.

FIG. 7 is a flowchart illustrating a Delete operation of a KV store, according to an embodiment.

Referring to FIG. 7, in step 701, upon receiving a Delete command for deleting a KV from the KV store, the KV store checks a Bloom filter tracking key entries in a key logger for the presence of the key to be deleted.

When the Bloom filter for the key logger suggests a hit for the key in step 703, the KV store traverses a hashmap for keys in the key logger in order to check for the presence of a matching keyname in step 705. For example, if the received Delete command is for deleting a KV for Key33, the KV determines whether the key logger already includes an entry for Key33.

When there is a matching keyname in the key logger in step 707, the operation proceeds to step 711.

However, when the Bloom filter for the key logger does not suggest a hit for the key in step 703 or when there is not a matching keyname in the key logger in step 707, the KV store determines if the key is present in the device hashmap in step 709.

When the key is not present in the device hashmap in step 709, the operation ends as there is no key available to delete.

However, when the key is present in the device hashmap in step 709, the operation proceeds to step 711.

In step 711, the KV store creates a Delete key entry and appends it to the key logger. For example, a Delete Key Entry tuple contains an indication of the key to be deleted, an address of the NAND page containing an extent map of the key (e.g., as read from the previous entry of the key in key logger), a delete opcode, and a current entry in tail pointer table.

In step 713, the KV store updates the address of the key entry in tail pointer table to reflect the new Delete key entry.

In step 715, the KV store defers the actual deletion of the key from the device hashmap. That is, the KV store waits to execute the delete operation until a certain threshold is reached within the key logger, as described above with reference to FIGS. 4A and 4B.

Figure 8:
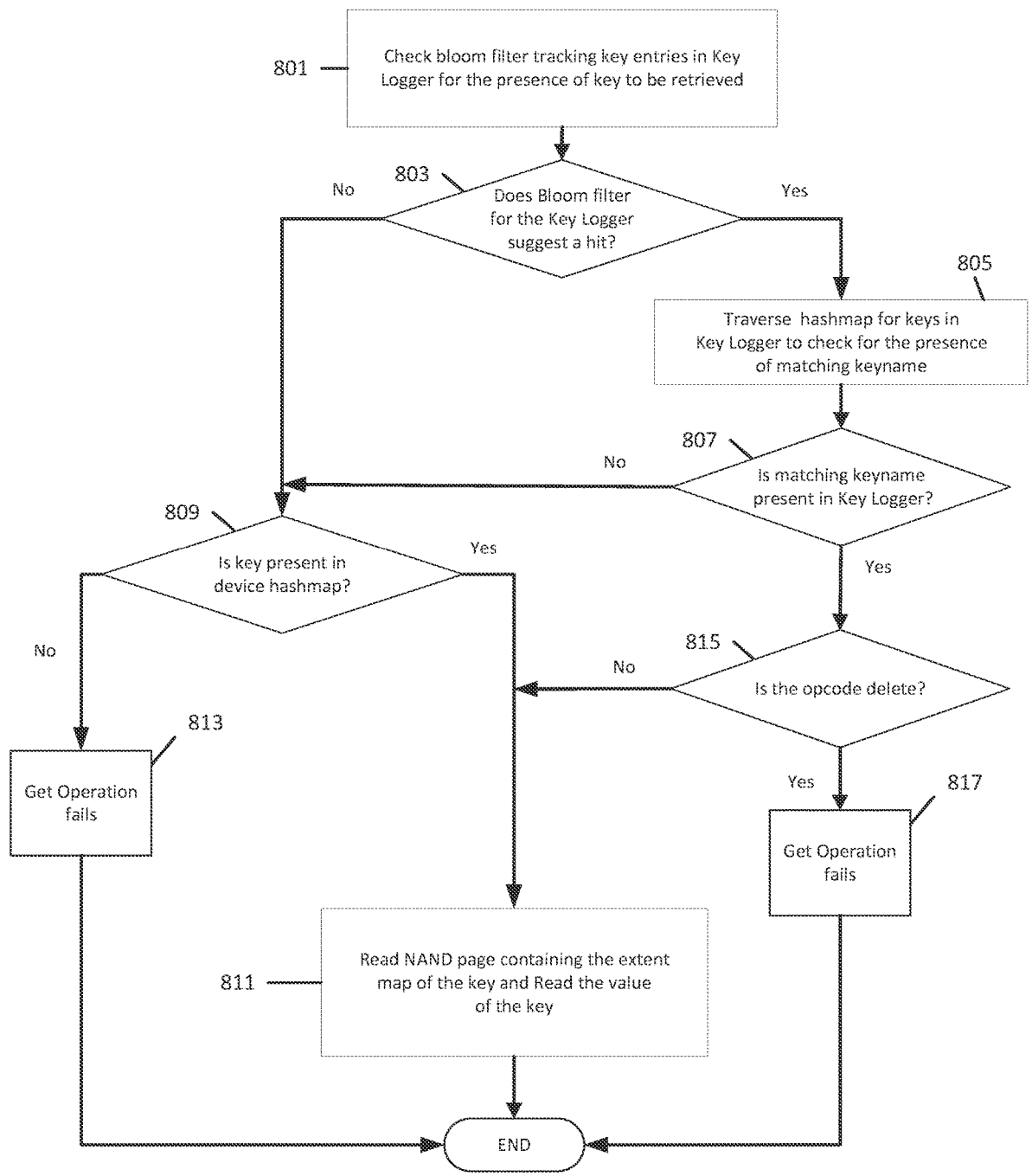
FIG. 8 is a flowchart illustrating a Get operation of a KV store, according to an embodiment.

FIG. 8 is a flowchart illustrating a Get operation of a KV store, according to an embodiment.

Referring to FIG. 8, in step 801, upon receiving a Get command for retrieving a stored KV, the KV store checks a Bloom filter tracking key entries in a key logger for the presence of the key to be retrieved.

When the Bloom filter for the key logger suggests a hit for the key in step 803, the KV store traverses a hashmap for keys in the key logger in order to check for the presence of a matching keyname in step 805. For example, if the received Get command is for retrieving a KV for Key77, the KV determines whether the key logger already includes an entry for Key77.

When there is a matching keyname in the key logger in step 807, the KV stores determines whether the matching keyname in the key logger includes an opcode for delete in step 815.

When the matching keyname in the key logger includes an opcode for delete in step 815, the Get operation fails in step 817. For example, if the Get command is for retrieving a KV for Key88, but the key logger already includes an command entry to delete the KV for Key88, then the retrieve operation fails.

However, when the matching keyname in the key logger does not include an opcode for delete in step 815, e.g., the matching keyname includes an opcode for store, the operation proceeds to step 811.

When the Bloom filter for the key logger does not suggest a hit for the key in step 803 or when there is not a matching keyname in the key logger in step 807, the KV store determines if the key is present in the device hashmap in step 809.

When the key is not present in the device hashmap in step 809, the Get operation fails in step 813, as there is no key available to retrieve.

However, when the key is present in the device hashmap in step 809, the operation proceeds to step 811.

In step 811, the KV store reads a NAND page containing an extent map of the key and then reads the value of the key from the NAND page or pages identified by the extent map. As described above, because the device hashmap stores may store multiple keys and extent pointers, which point NAND pages containing extent maps for the keys, on a single NAND page, the KV may be able to quickly identify the NAND page containing an extent map of the key and then read the value of the key from the NAND page or pages identified by the extent map.

Figure 9:
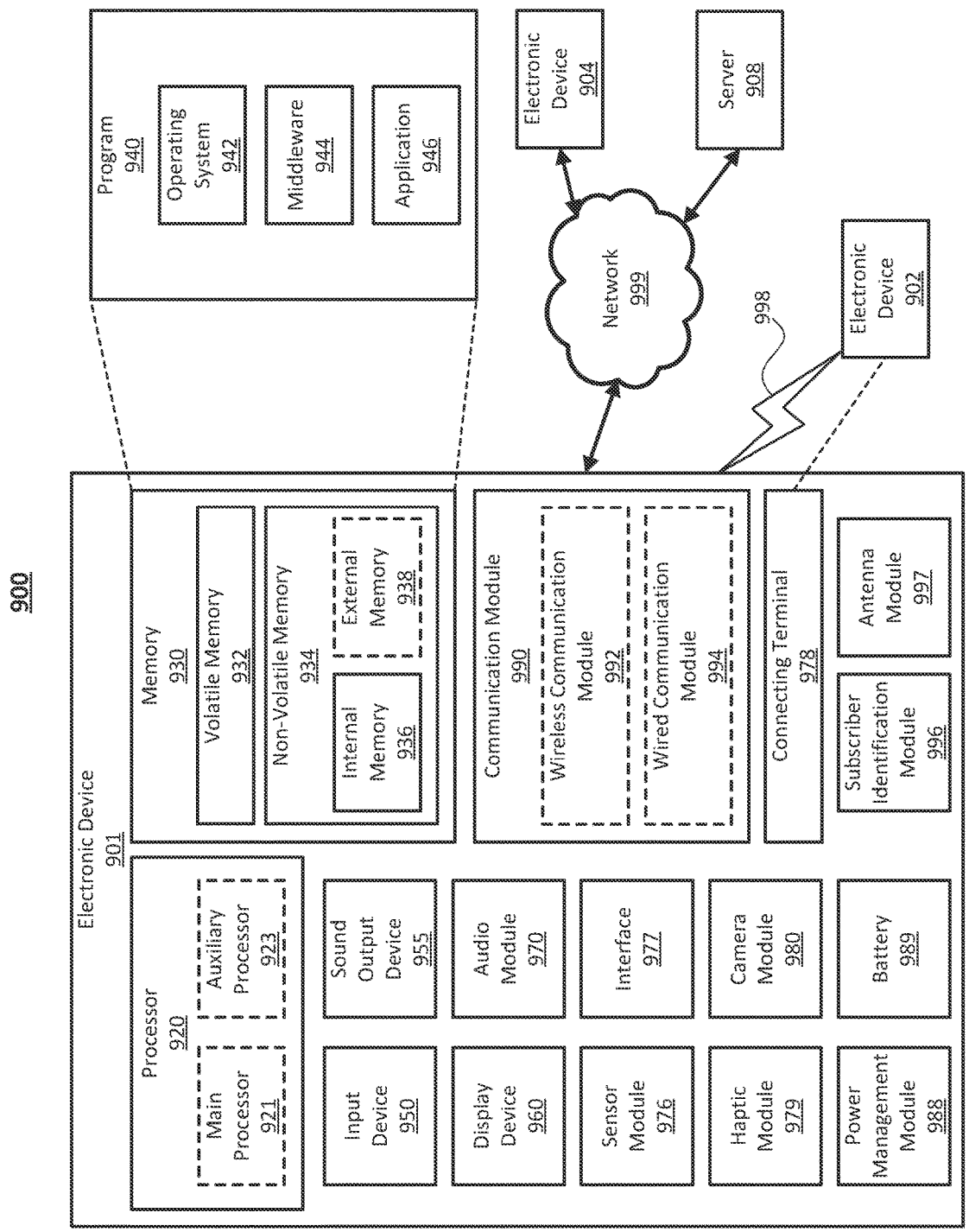
FIG. 9 illustrates a block diagram of an electronic device in a network environment, according to an embodiment.

FIG. 9 illustrates a block diagram of an electronic device 901 in a network environment 900, according to one embodiment.

Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). The electronic device 901 may communicate with the electronic device 904 via the server 908. The electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In one embodiment, at least one (e.g., the display device 960 or the camera module 980) of the components may be omitted from the electronic device 901, or one or more other components may be added to the electronic device 901. In one embodiment, some of the components may be implemented as a single integrated circuit (IC). For example, the sensor module 976 (e.g., a fingerprint sensor, an iris sensor, or an illuminance sensor) may be embedded in the display device 960 (e.g., a display).

The processor 920 may execute, for example, software (e.g., a program 940) to control at least one other component (e.g., a hardware or a software component) of the electronic device 901 coupled with the processor 920, and may perform various data processing or computations. As at least part of the data processing or computations, the processor 920 may load a command or data received from another component (e.g., the sensor module 976 or the communication module 990) in volatile memory 932, process the command or the data stored in the volatile memory 932, and store resulting data in non-volatile memory 934. The processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or execute a particular function. The auxiliary processor 923 may be implemented as being separate from, or a part of, the main processor 921.

The auxiliary processor 923 may control at least some of the functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to one embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to one embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to one embodiment, the audio module 970 may obtain the sound via the input device 950, or output the sound via the sound output device 955 or a headphone of an external electronic device 902 directly (e.g., wired) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. The sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device 902 directly (e.g., wired) or wirelessly. According to one embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device 902. According to one embodiment, the connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or an electrical stimulus which may be recognized by a user via tactile sensation or kinesthetic sensation. According to one embodiment, the haptic module 979 may include, for example, a motor, a piezoelectric element, or an electrical stimulator.

The camera module 980 may capture a still image or moving images. According to one embodiment, the camera module 980 may include one or more lenses, image sensors, image signal processors, or flashes.

The power management module 988 may manage power supplied to the electronic device 901. The power management module 988 may be implemented as at least part of, for example, a power management integrated circuit (PMIC).

The battery 989 may supply power to at least one component of the electronic device 901. According to one embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the AP) and supports a direct (e.g., wired) communication or a wireless communication. According to one embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or a standard of the Infrared Data Association (IrDA)) or the second network 999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to one embodiment, the antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. All or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

One embodiment may be implemented as software (e.g., the program 940) including one or more instructions that are stored in a storage medium (e.g., internal memory 936 or external memory 938) that is readable by a machine (e.g., the electronic device 901). For example, a processor of the electronic device 901 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 10:
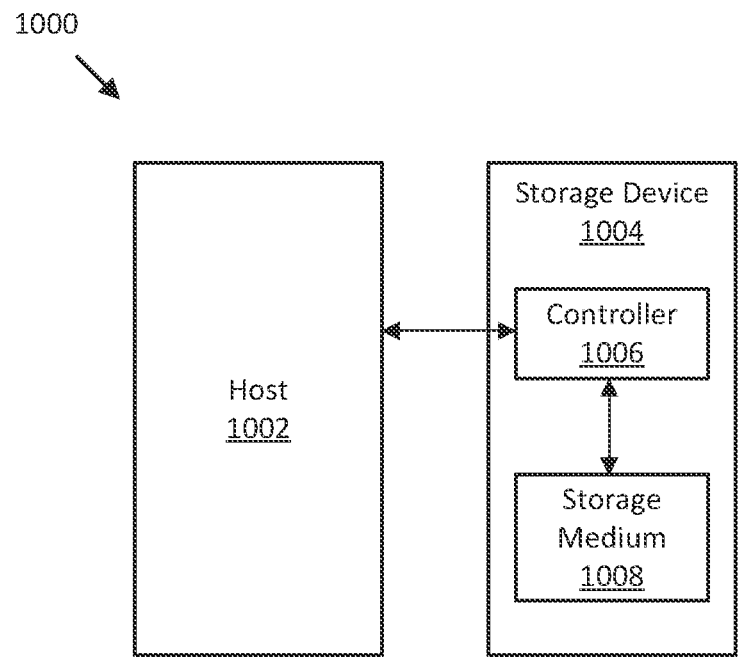
FIG. 10 illustrates a diagram of a storage system, according to an embodiment.

FIG. 10 illustrates a diagram of a storage system 1000, according to an embodiment.

The storage system 1000 includes a host 1002 and a storage device 1004. Although one host and one storage device is depicted, the storage system 1000 may include multiple hosts and/or multiple storage devices. The storage device 1004 may be an SSD, a universal flash storage (UFS), etc. The storage device 1004 includes a controller 1006 and a storage medium 1008 connected to the controller 1006. The controller 1006 may be an SSD controller, a UFS controller, etc. The storage medium 1008 may include a volatile memory, a non-volatile memory, or both, and may include one or more flash memory chips (or other storage media). The controller 1006 may include one or more processors, one or more error correction circuits, one or more field programmable gate arrays (FPGAs), one or more host interfaces, one or more flash bus interfaces, etc., or a combination thereof. The controller 1006 may be configured to facilitate transfer of data/commands between the host 1002 and the storage medium 1008. The host 1002 sends data/commands to the storage device 1004 to be received by the controller 1006 and processed in conjunction with the storage medium 1008. As described herein, the methods, processes and algorithms may be implemented on a storage device controller, such as controller 1006. The sources and destinations described herein may correspond to elements of the host 1002 (i.e., processors or applications) and the storage medium 1008.

In accordance with the above-described embodiments, a system and method are provided, which allow for the packing of multiple keys together in a single NAND page in order to reduce the worst case collision length in a device hashmap by a packing factor P (i.e., the average number of keys packed per page).

Further, related keys that have no temporal locality may be grouped together to have spatial locality. That is, keys that map to adjacent buckets in a device hashmap can be grouped together even though the keys themselves have no temporal locality.

Accordingly, the number of NAND pages required to store all keys, and RAF/WAF reduction due to dense key packing may be reduced. Further, NAND pages may reduce GC to when all keys in a page are invalidated.

Accordingly, the present disclosure may significantly reduce GC overheads by a factor of packing density and reduce lengths of hash-map collision chains, which may improve tail latency and lessen the number of NAND page reads that can significantly decrease lookup latencies.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A key value (KV) store, comprising:
a key logger; and
a processor configured to:
receive a first command for storing a first KV in the KV store,
write a first value of the first KV to a first memory page,
generate an extent map for identifying the first memory page including the first value,
write the extent map to a second memory page,
append an entry for storing the first KV to the key logger, and
update a device hashmap of the KV store to include a first key of the first KV, upon a threshold being met within the key logger.

2. The KV store of claim 1, wherein the first key of the first KV is stored on a third memory page with at least one other key and includes an extent pointer that points to the second memory page including the extent map.

3. The KV store of claim 2, wherein the entry for storing the first KV to the key logger includes at least one of the first key, an indication of the second memory page including the extent map, an opcode for the first command, or a tail entry pointer.

4. The KV store of claim 2, wherein the processor is further configured to update the device hashmap by:
collating key entries belonging to a group of adjacent buckets in the device hashmap;
merging existing keys in the device hashmap with entries from the key logger, to form packed keys for the group of adjacent buckets;
writing the packed keys to the third memory page; and
updating the device hashmap to point to the third memory page including the packed keys.

5. The KV store of claim 1, further comprising a Bloom filter,
wherein the processor is further configured to update the Bloom filter to indicate reception of the first command for storing the first KV.

6. The KV store of claim 1, further comprising a tail pointer table,
wherein the processor is further configured to:
select a slot in the tail pointer table based on a hash of the key first of the first KV, and write a current offset in the key logger to the selected slot.

7. The KV store of claim 1, wherein the processor is further configured to clear the key logger.

8. The KV store of claim 1, wherein the processor is further configured to:
receive a second command for deleting a second KV from the KV store,
determine if the key logger includes an entry for the second KV or the second KV is present in the device hashmap, and
in response to determining that the key logger includes the entry for the second KV or the second KV is present in the device hashmap, append an entry for deleting the second KV to the key logger, and delete a second key of the second KV from the device hashmap, upon the threshold being met within the key logger.

9. The KV store of claim 8, further comprising a Bloom filter,
wherein the processor is further configured to check the Bloom filter for a previous entry for the second KV before determining if the key logger includes the entry for the second KV.

10. The KV store of claim 1, wherein the processor is further configured to:
receive a third command for retrieving a second KV from the KV store,
identify an entry for the second KV in the key logger,
identify that an opcode for the entry for the second KV in the key logger is for a deletion operation, and
identify that that the third command fails, based on the opcode for the entry for the second KV in the key logger being for the deletion operation.

11. The KV store of claim 10, further comprising a Bloom filter,
wherein the processor is further configured to check the Bloom filter for a previous entry for the second KV before identifying that the key logger includes the entry for the second KV.

12. The KV store of claim 1, wherein the processor is further configured to:
receive a third command for retrieving a second KV from the KV store, and
identify the second KV in the device hashmap.

13. The KV store of claim 12, wherein the processor is further configured to:
read a third memory page including a second extent map of a second key of the second KV, and
read a second value of the second KV from a fourth memory page, based on the second extent map.

14. A method of operating a key value (KV) store, the method comprising:
receiving a first command for storing a first KV in the KV store;
writing a first value of the first KV to a first memory page;
generating an extent map for identifying the first memory page including the first value;
writing the extent map to a second memory page;
appending an entry for storing the first KV to a key logger of the KV store; and
updating a device hashmap of the KV store to include a first key of the first KV, upon a threshold being met within the key logger.

15. The method of claim 14, wherein the first key of the first KV is stored on a third memory page with at least one other key and includes an extent pointer that points to the second memory page including the extent map.

16. The method of claim 15, wherein the entry for storing the first KV to the key logger of the KV store includes at least one of the first key, an indication of the second memory page including the extent map, an opcode for the first command, or a tail entry pointer.

17. The method of claim 15, wherein updating the device hashmap comprises:
collating key entries belonging to a group of adjacent buckets in the device hashmap;
merging existing keys in the device hashmap with entries from the key logger to form packed keys for the group of adjacent buckets;
writing the packed keys to the third memory page; and
updating the device hashmap to point to the third memory page including the packed keys.

18. The method of claim 14, further comprising updating a Bloom filter of the key logger to indicate reception of the first command for storing the first KV.

19. The method of claim 14, further comprising:
selecting a slot in a tail pointer table based on a hash of the key first of the first KV; and
writing a current offset in the key logger to the selected slot.

20. A storage system, comprising:
a key value (KV) store; and
a processor configured to:
receive a first command for storing a first KV in the KV store,
write a first value of the first KV to a first memory page,
generate an extent map for identifying the first memory page including the first value,
write the extent map to a second memory page,
append an entry for storing the first KV to a key logger of the KV store, and
update a device hashmap of the KV store to include a first key of the first KV, upon a threshold being met within the key logger.

* * * * *